United States Patent [19]

Ghisolfi

[11] Patent Number: 5,338,808
[45] Date of Patent: Aug. 16, 1994

[54] PROCESS FOR THE PRODUCTION OF HIGH MOLECULAR WEIGHT POLYESTER RESINS

[75] Inventor: Guido Ghisolfi, Tortona, Italy

[73] Assignee: M.& G. Ricerche S.p.A., Pozzilli, Italy

[21] Appl. No.: 952,884

[22] PCT Filed: Mar. 26, 1992

[86] PCT No.: PCT/EP92/00670
§ 371 Date: Dec. 28, 1992
§ 102(e) Date: Dec. 28, 1992

[87] PCT Pub. No.: WO92/17522
PCT Pub. Date: Oct. 15, 1992

[30] Foreign Application Priority Data

Mar. 29, 1991 [IT] Italy .................. MI91A000884

[51] Int. Cl.$^5$ ............................................ C08F 20/00
[52] U.S. Cl. ................................ 525/437; 528/486; 528/503; 528/302; 528/481; 528/483; 264/211.11; 264/211.17; 264/211.21
[58] Field of Search .............. 525/437; 528/486, 503, 528/302, 481, 483; 264/211.11, 211.17, 211.21

[56] References Cited

U.S. PATENT DOCUMENTS

| | | | |
|---|---|---|---|
| 3,553,157 | 1/1971 | Dijkstra et al. | 523/444 |
| 4,176,101 | 11/1979 | Leslie et al. | 524/230 |
| 4,234,708 | 11/1980 | Edelman et al. | 525/444 |
| 4,880,860 | 11/1989 | Blöcker | 524/94 |

FOREIGN PATENT DOCUMENTS

| | | |
|---|---|---|
| 0422282 | 4/1991 | European Pat. Off. . |
| 2250782 | 6/1975 | France . |
| 56112 | 9/1968 | Luxembourg . |

OTHER PUBLICATIONS

World Patents Index, Derwent Publications Ltd., London, GB, Class A23-G2, AN 41720R & JP B,70 14671 (Tokyo Shibaura Electric Co. Ltd.) Jun. 8, 1970.

*Primary Examiner*—Samuel A. Acquah
*Attorney, Agent, or Firm*—Edward D. Manzo; Andrew G. Kolomayets

[57] ABSTRACT

A process for the solid state upgrading of a polyester resin by polyaddition reaction in which the resin is upgraded in the presence of an upgrading additive which is a compound different from a dianhydride of an aromatic tetracarboxylic acid, containing two groups capable of addition reactions with the terminal groups of the polyester, selected for example in the group of the dianhydrides of aliphatic and cycloaliphatic tetracarboxylic acids.

8 Claims, No Drawings

PROCESS FOR THE PRODUCTION OF HIGH MOLECULAR WEIGHT POLYESTER RESINS

The present invention relates to a process for the production of high molecular weight polyester resins from resins having lower molecular weight using a new polyaddition process in the solid state.

Particularly, the invention relates to a process in which the polyester resin is blended in molten state with a new upgrading additive capable of addition reactions with the terminal groups of the polyester resin which is then granulated, and the granulate subjected to crystallization and upgrading reaction in the solid state.

In Applicant's previous pending European patent application EP No. 89119049.8 a solid state upgrading process is described in which the polyester resin is upgraded in the presence of a dianhydride of an aromatic tetracarboxylic acid.

The solid state upgrading process according to the invention comprises the steps of blending the resin with the new upgrading additive, pelletizing the resin, subjecting the granules to crystallization and then to upgrading at temperatures in the range from 100° to 230° C.

The process is preferably carried out in continuous way using continuous crystallizers and reactors where the chips are fed counter currently with a stream of heated gas such as air, nitrogen, carbon dioxide.

The well known solid state polycondensation reactions mainly consist of post-transesterification and esterification reactions, the by-products of which are ethylene glycol and water.

The diffusion of these by-products of the granules is the factor controlling the kinetic of the upgrading process.

In the solid state polyaddition process of the invention in which the polymer chain extension is obtained by addition reactions of the particular additive used, there is no formation of by-products which adversely affect the upgrading process. The process therefore can be carried out at temperatures lower than those up to now used or, then the same upgrading temperature is used, the increase of IV can be obtained with much shorter residence times, for instance, residence time of only 2–5 hours can be used instead of the 15–38 hours needed with the known upgrading processes. The shorter residence times result in an increased productivity of the plant.

The possibility of using lower upgrading temperatures allows to upgrade polyester resins such as the copolyethylenterephthalates containing 10–20% of units deriving from isophthalic acid (COPETs) which have low melting points (lower than 220° C.) and which cannot be upgraded in the solid state using the known solid state polycondensation processes, due to the sticking of the COPETs on the walls of the reactor.

In the case of COPETs the upgrading process can be carried out at temperatures from about 100° C. to 180° C.

The upgrading additive used in the process of the invention is a compound different from a dianhydride of an aromatic tetracarboxylic acid, containing at least two groups capable of addition reactions with the terminal OH and COOH groups of the polyester resin.

By addition reactions it is intended the addition reactions between the terminal groups of the polyester resin and the upgrading additive leading to a linear extension of the polymer chain length.

By upgrading process it is meant the process or the conditions which lead to an increase of the intrinsic viscosity of the polyester resin.

Groups capable of addition reaction under the upgrading conditions comprise the anhydride group, the isocyanate group, the imino group.

A criterion for determining the capability of a substance to give addition reactions with the terminal groups of the polyester resin is the increase of the viscous modulus of at least 20% with respect to the polyester without additive, determined by rheometric measurement at 270° C.

Representative upgrading additives are the dianhydrides of aliphatic and cycloaliphatic tetracarboxylic acids, and of tetrahydrofuran acids. Aromatic or aliphatic diisocyanates or polyisocyanates are also suitable.

The preferred dianhydrides are selected from the group consisting of 1,2,3,4-cyclobutanetetracarboxylic acid dianhydride; 3,4-dicarboxy-1,2,3,4-tetrahydro-1-naphthalenesuccinic acid dianhydride; bicyclo (2,2,2)oct-7-ene-2,3,5,6-tetracarboxylic acid dianhydride: tetrahydrofuran 2,3,4,5 tetracarboxylic dianhydride.

Particularly preferred is 1,2,3,4 cyclobutanetetracarboxylic acid dianhydride.

As herebefore indicated, the crystallization and upgrading step are carried out in a range of temperatures from 100° C. to 230° C.

Apparatus suitable for carrying out the steps can be those described in U.S. Pat. Nos. 4,064,112 and 4,161,578 the description of which is herewith incorporated by reference.

The inert gas steams used in these steps can be recycled according to European application, 86830340.5 the description of which is also incorporated by reference.

With the term polyester resin is intended a resin comprising polycondensation products of $C_2$–$C_{10}$ glycols e.g. ethylene glycol, 1,4 butylene glycol, with terephthalic acid or derivatives thereof e.g. dimethyl terephthalate, as well as polycondensation products containing besides units derived from terephthalic acid also units deriving from isophthalic acid, naphthalene dicarboxylic acid, orthophthalic acids and 5-tert-butyl-1,3 benzenedicarboxylic acid in amounts from about 0.5 to 25 mole per cent of the total acid units. The process is particularly advantageous for alkylene terephthalate and copolyalkylene therephtalets utilized for injection molding, extrusion blow molding and extrusion applications such as tubing, films, sheets and foaming.

The blending of polyester resin with the upgrading additive is preferably carried out in co-rotating or counter rotating intermeshing or non-intermeshing twin screw extruders with or without venting, at a temperature between 200° and 350° C., depending on the melting point of the polyester and the residence time, sufficient to obtain a homogeneous blending of the additive.

A counter rotating non-intermeshing vented or not vented twin screw extruder is preferred. The use of such type of extruder allows to perform a good distribution of the additive in the melt and to avoid problems of local high concentrations of the additive due to its high reactivity.

The effective blending section of this type of extruder allows to operate with residence time very short, generally less than 120 seconds, preferably comprised between 15 and 30 seconds.

The process may be performed continuously, that is without interruption from the melt polyester polycondensation plant and the blending.

In this case, the extruder is fed directly with the molten low molecular weight polyester resin.

The extruder may also be fed with solid polyester granulate produced in another plant.

The extruder is preferably connected with a high vacuum oil seal pump to maintain a vacuum higher than 2 torr for the devolatization of the reactive mixture and for obtaining a resin with a low content of acetaldehyde. However, the blending could also be performed without the use of vacuum.

The preferred concentration of the upgrading additive with respect to the polyester resin is 0.05–1% by weight, but higher concentration may also be used.

To avoid random local concentration of the additive in the melt, it is advisable to dilute the additive with crystallized PET powder (1 part of additive to 5 parts of PET powder). This procedure will ensure a homogeneous distribution of additive in the melt leading to a better reproducibility of the end product intrinsic viscosity and inhibiting the gel formation.

The additive can also be diluted by blending with crystallized PET-chips (1 additive to 10 parts PET chips).

The blending could be performed in the solid state in fanned blender using about 0.1% weight of polythylenglycol or polycaprolactone and similar products, as adhesives, and using blending temperature of about 150° C.

The following examples are given to illustrate but not to limit the scope of the invention.

EXAMPLE 1

30 Kg/H random COPET melt (15% isophthalic acid in weight, melting point 212° C., IV=0.75 dl/g) having a content of 110 ppm acetaldehyde were fed continuously from the finisher of a PET melt polycondensation plant to a counter rotating non-intermeshing 30 mm twin screw extruder with venting capability.

220 g/h of a mixture of 20% weight of 1, 2, 3, 4-cyclobutanetetracarboxylic acid dianhydride in crystallized COPET powder (IV: 0.75 dl/g; 15% weight isophthalic acid) were fed to the extruder using a gravimetric feeder. The test conditions were as follows:
  cyclobutane tetracarboxylic acid dianhydride in the COPET melt=0.15% by weight
  screw speed: 415 RPM
  ratio length-diameter (L/D): 24
  average residence time: 18–25 sec.
  barrel temperature: 235° C.
  product melt temperature: 290° C.
  vacuum: 1–5 torr.

A die with double holes was used as extruder die (diameter 7 mm).

A strand pelletizer was used to obtain the COPET-chips, which had a cylindrical shape with a diameter of 3 mm and a length of 5 mm, and with an intrinsic viscosity IV=0.865±0.01 dl/g.

The COPET chips had an acetaldehyde content of 6–9 ppm. During the test period, the IV of the product was constant over a period of 2 weeks.

The melting point of the product was 212° C.

The chips were then fed continuously into a solid state crystallization/polyaddition plant as described in European application EP 86830340.5 using the recycling of the inert gas therein described.

The crystallization temperature was 150° C. and the residence tame in the crystallizer was 40 min. The temperature in the solid state reactor was 150° C. and the residence time was 10 h. The IV of the upgraded products was 0.965 dl/g. The product was free from gel, with an acetaldehyde content of 0.60 ppm.

In comparison, there was no upgrading of COPET not added with the dianhydride (starting IV=0.75 dl/g), using the same conditions for crystallization and upgrading as above indicated.

EXAMPLE 2

The COPET of example 1 was used, but in the form of crystallized granules (IV=0.75 dl/g) instead of COPET melt.

The crystallized COPET chips were dried and fed into the twin screw extruder.

The IV of the product was 0.86±0.02 dl/g.

The same conditions were used as in example 1; only the average residence time was about 25 sec.

The solid state treatment conditions were 130°–140° C. in the cystallizer and 140° C. in the reactor. The residence time in the reactor was 19 hours. The chips intrinsic viscosity was 0.94±0.015 dl/g. The acetaldehyde content was 0.67 ppm.

EXAMPLE 3

30 kg/h of PET melt (IV=0.75 dl/g) having a content of 100 ppm acetaldehyde were fed continuously from The finisher of a PET polycondensation melt plant into a counter rotating not intermeshing twin screw extruder without venting capabilities.

220 g/h of a mixture of 20% weight of cyclobutanetetracarboxylic acid dianhydride in crystallized PET powder (IB of the PET powder=0.75 dl/g) were fed into the extruder using a gravimetric feeder. The test conditions were as follows:
  cyclobutane tetracarboxylic acid dianhydride in the PET melt=0.15% by weight
  screw speed: 415 RPM
  ratio length-diameter (L/D): 24
  barrel temperature: 235° C.
  product melt temperature: 288° C.
  average residence time: 18–25 sec.

A die with a double hole was used as extruder die.

A strand pelletizer was used to obtain the PET-chips, which had a cylindrical shape with an intrinsic viscosity IV=0.835±0.02 dl/g.

The chips were fed into a solid state crystallization/polyaddition plant as described in European application EP 86830340.5.

The temperature in the crystallizer was 130°–140° C. and the residence time of 40 min.

The temperature in the upgrading reactor was 130°–140° C. and the residence time was 19 h.

The IV of the upgraded product was 0.94±0.015 dl/g.

The product was free from gel, with an acetaldehyde content of 0.85 ppm.

Analytical Procedures

The viscosity was determined on a solution if 0.5 g. of polyester pellets in 100 ml. of a 60/40 by weight mixture of phenol and tetrachloroethane at 25° C. according to ASTM D 4603-86.

The acetaldehyde content was determined with a gas chromatic method, according to ASTM D 4526-85, using a Perking Elmer 8700 gas chromatograph (Perkin Elmer model HS 101).

The extraction conditions were 150° C. for 90 mins.

I claim:

1. A process for the continuous production of high molecular weight polyester resins from resins having a lower molecular weight comprising the steps of blending the resin in molten state with additive different from a dianhydride of an aromatic tetracarboxylic acid, pelletizing the resin to form granules, subjecting the granules to crystallization and then to a solid state polyaddition reaction, characterized in that the additive is a compound containing at least two groups which react by addition reactions in the solid state with the terminal groups of the resin.

2. Process according to claim 1 characterized in that the additive is selected from the group of dianhydrides of aliphatic, cycloaliphatic and hydrofuran tetracarboxylic acids.

3. Process according to claim 1 characterized in that the blending of the additive with the polyester resin is carried out in a twin screw extruder at temperature from 200° to 350° C. and with residence time less than 120 seconds.

4. Process according to claim 1 characterized in that the additive is used in an amount comprised from 0.1 to 1% by weight with respect to the polyester resin.

5. Process according to claim 1 characterized in that the crystallization and the solid state polyaddition reaction temperature is comprised from 100° to 230° C.

6. Process according to claim 1 characterized in that the polyester resin is a copolyethyleneterephthalate containing 1-25% by weight of units deriving from isophthalic acid.

7. Process according to claim 6 characterized in that the copolyester contains 10-20% of unit deriving from isophthalic acid and in that the solid state polyaddition reaction temperature is comprised from 100° to 180° C.

8. Polyester resins obtained according to the process of claim 1.

* * * * *